United States Patent [19]
Yoo

[11] Patent Number: 5,769,356
[45] Date of Patent: Jun. 23, 1998

[54] TAPE GUIDE STRUCTURE FOR USE IN A VIDEO CASSETTE RECORDER

[75] Inventor: Hyo-Jong Yoo, Seoul, Rep. of Korea

[73] Assignee: Daewoo Electronics Co., Ltd., Seoul, Rep. of Korea

[21] Appl. No.: 753,524

[22] Filed: Nov. 26, 1996

[30]   Foreign Application Priority Data

Nov. 28, 1995 [KR]  Rep. of Korea ..................... 95-44360

[51] Int. Cl.⁶ ........................... B65H 57/00; B65H 20/00; G03B 23/02
[52] U.S. Cl. ........................ 242/615; 226/194; 242/346; 242/346.2
[58] Field of Search .................................. 226/196, 194, 226/197; 242/346, 346.2, 615

[56]   References Cited

U.S. PATENT DOCUMENTS

| | | | |
|---|---|---|---|
| 3,734,373 | 5/1973 | Dattilo | .................................. 226/196 |
| 3,799,422 | 3/1974 | Matsumoto . | |
| 3,967,769 | 7/1976 | Matsumoto | .............................. 226/194 |
| 4,403,720 | 9/1983 | Grant | .................................. 226/196 X |
| 4,756,461 | 7/1988 | Tanaka et al. | ....................... 226/196 X |
| 4,860,141 | 8/1989 | Yoshimura . | |
| 5,295,618 | 3/1994 | Saito | ....................................... 226/196 |

FOREIGN PATENT DOCUMENTS

| | | |
|---|---|---|
| 0493880 | 7/1992 | European Pat. Off. . |
| 2071899 | 9/1981 | United Kingdom . |

*Primary Examiner*—Michael Mansen
*Attorney, Agent, or Firm*—Pennie & Edmonds LLP

[57]   ABSTRACT

A tape guide structure, for use in a video cassette recorder ("VCR") into which a tape cassette is loaded, comprises a guide post and a post cap. The guide post is provided with a lower cylindrical portion and an upper cylindrical portion with a diameter less than that of the lower portion. The guide post is fixed to a deck. The post cap is provided with a head portion with a slant surface and is fixed on top of the guide post. According to the tape guide structure of the present invention, even though the tape cassette is loaded into the VCR with the tape loosened to the extend that it passes over the central axis of the guide post, the tape comes in contact with the slant surface of the head portion, thereby allowing the tape to be loaded into a correct position.

3 Claims, 4 Drawing Sheets

TAPE GUIDE STRUCTURE FOR USE IN A VIDEO CASSETTE RECORDER

FIELD OF THE INVENTION

The present invention relates to a tape guide structure for use in a video cassette recorder ("VCR"); and, more particularly, to a tape guide structure capable of allowing the tape in a tape cassette to be correctly loaded even if the tape is loosend.

DESCRIPTION OF THE PRIOR ART

Generally, when a tape cassette Ca is loaded in a VCR, the tape is normally located between a guide post 28 and a capstan shaft 26, as presented by the solid line L1 in FIG. 1. The tape is, then, drawn toward and wrapped around a head drum by a pair of pole bases 23, 24 moving along a pair of guide slots 21, 22, respectively. As indicated by the arrows in FIGS. 2A and 2B, upon the loading of the tape cassette Ca into the VCR, the cassette Ca first moves in a horizontal direction and, then, moves down in a vertical direction along loading slots 12, 13. Therefore, if the tape T is loosened to the extent that it passes over the central axis C of the guide post 28, the tape comes to be mislocated over the guide post 28 as presented by the projection line L2 in FIG. 1, resulting in malfunction of the VCR.

SUMMARY OF THE INVENTION

It is, therefore, a primary object of the invention to provide a tape guide structure capable of allowing the tape to be correctly loaded even if the tape in the tape cassette is loosened.

In accordance with one aspect of the present invention, there is provided a tape guide structure for use in a VCR into which a tape cassette is loaded, the tape guide structure comprising: a guide post provided with an upper cylindrical portion and a lower cylindrical portion with a diameter greater than that of the upper portion, the guide post being fixed to a deck; and a post cap provided with a head portion with a slant surface, the post cap being fixed on top of the guide post, thereby, when the tape cassette is loaded into the VCR with the tape loosened and contacting the slant surface of the head portion, allowing the tape to be loaded into a correct position.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENTS

Figure 1:
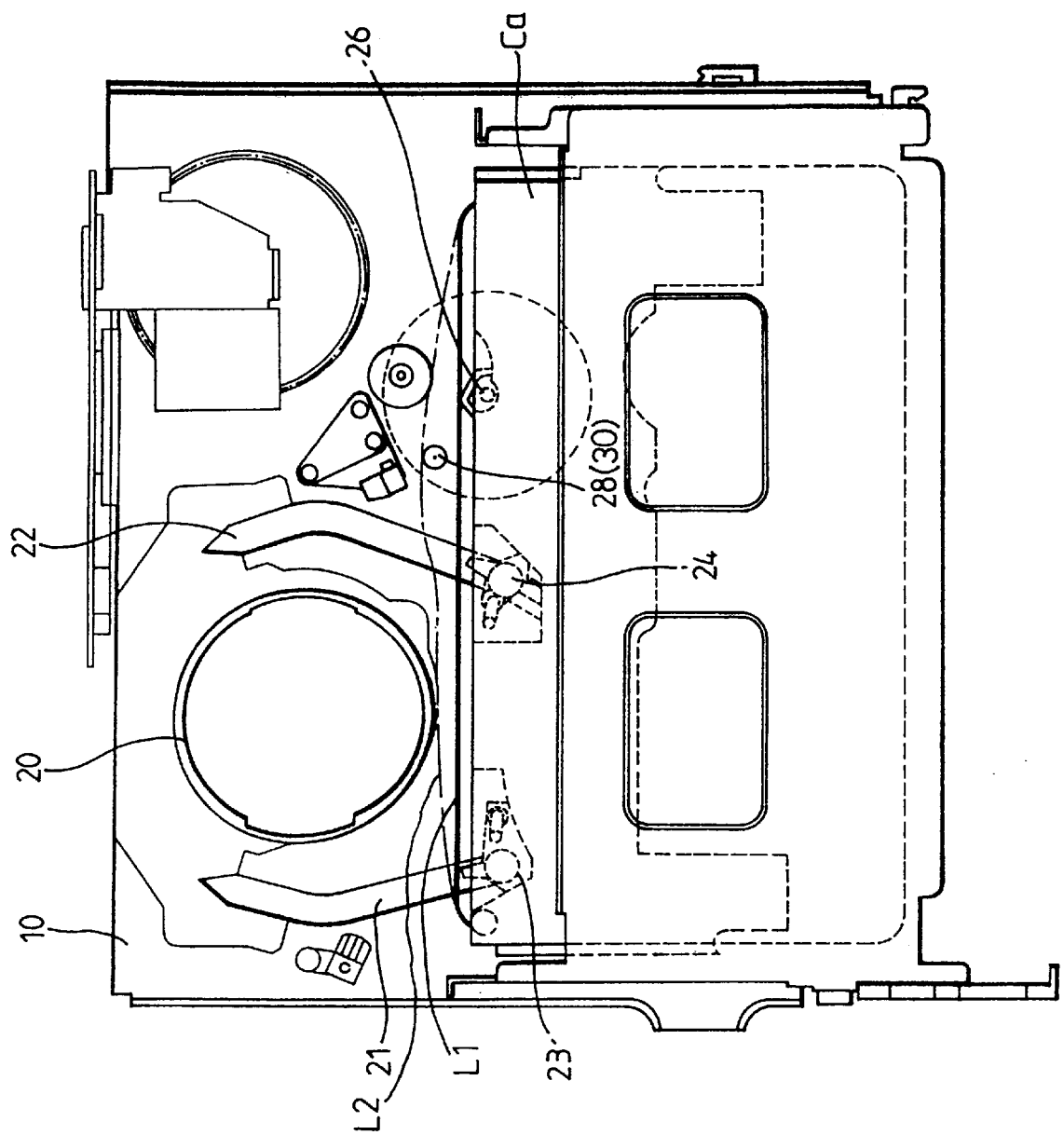
FIG. 1 depicts a schematic top view of a VCR, showing a state of a tape cassette loaded in the VCR.
Figure 2A:
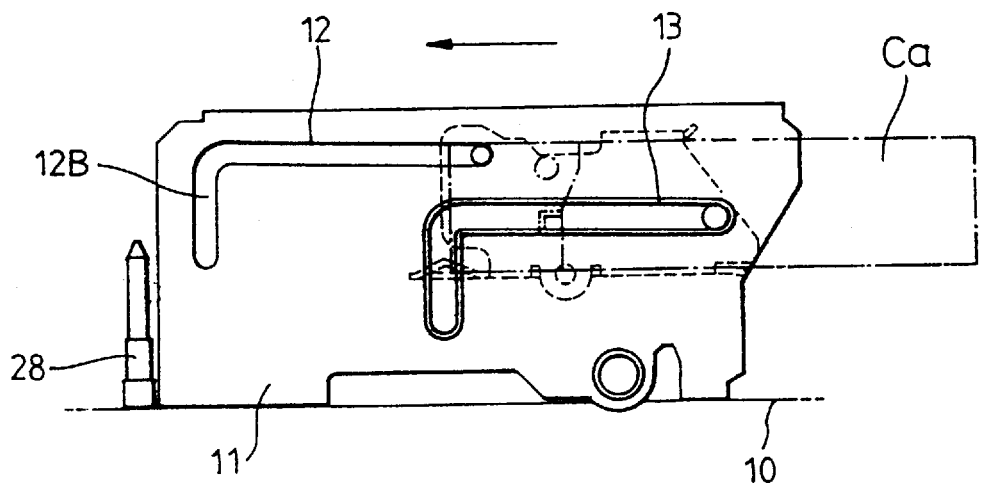
FIGS. 2A and 2B represent schematic side views of the VCR, showing a loading process of the tape cassette.
Figure 2B:
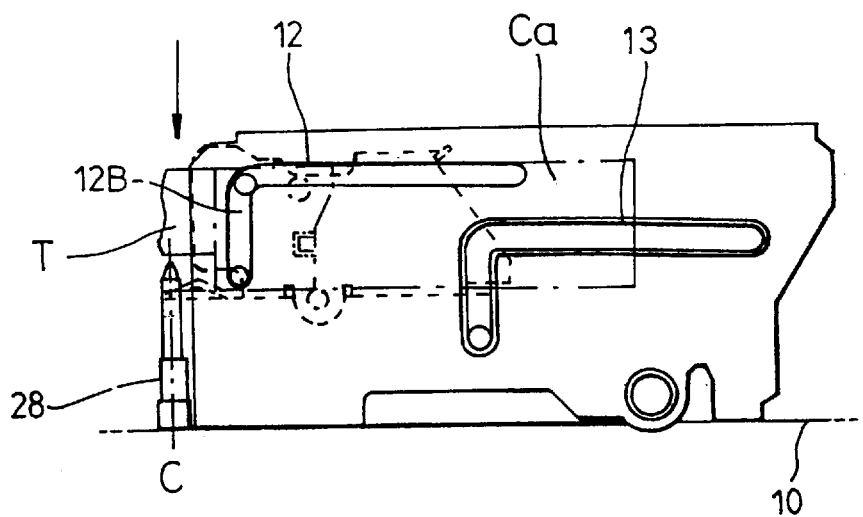
Figure 3:
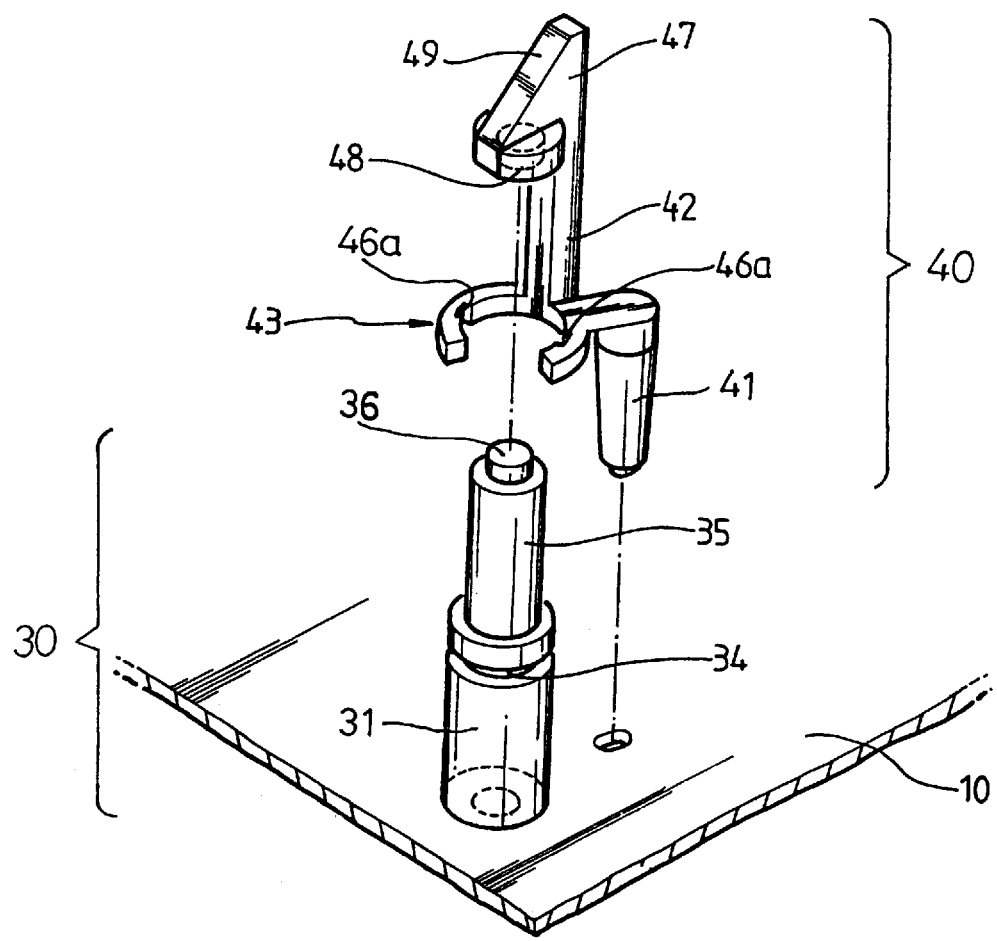
FIG. 3 illustrates an exploded perspective view of a tape guide structure of the present invention.
Figure 4:
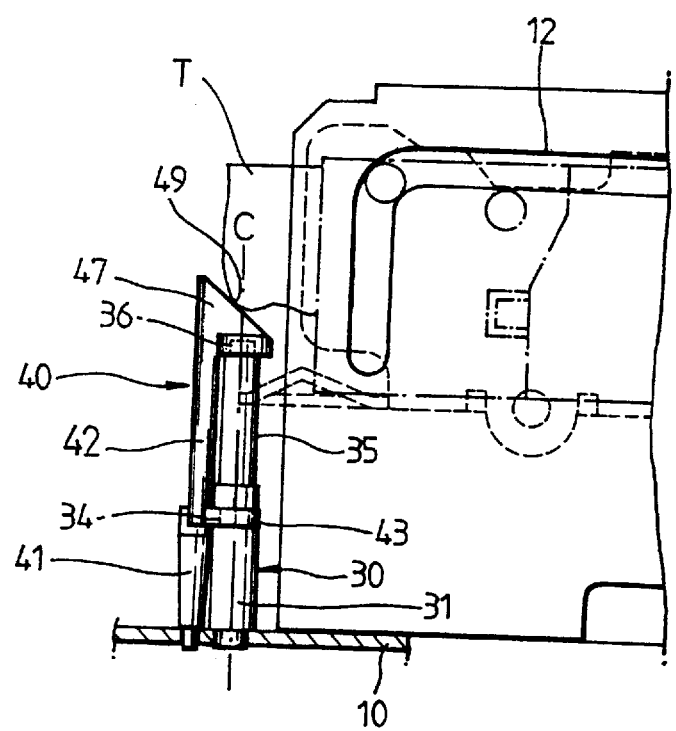
FIG. 4 sets forth a schematic partial side view of the VCR, showing how the tape guide structure of the present invention functions.

Although the main aspect of the inventive tape guide structure of the present invention is shown in FIGS. 3 and 4, FIG. 1 will be from time to time referenced in describing the present invention. Furthermore, like reference numerals represent same components in the drawings.

There is shown in FIG. 3 a schematic exploded perspective view of a tape guide structure in accordance with a preferred embodiment of the present invention.

The tape guide structure of the present invention comprises a guide post 30 and a post cap 40.

The guide post 30 is provided with an upper cylindrical portion 35 and a lower cylindrical portion 31 with a diameter greater than that of the upper portion 35. The upper portion 35 contacts and guides the tape running in the VCR. The upper portion 35 has a protuberance 36 formed on top thereof and the lower portion 31 has a circumferential groove 34 formed therearound. The guide post 30 is fixed at a position adjacent to a capstan shaft 26 on a deck 10 (see FIG. 1).

The post cap 40 is provided with a head portion 47 with a slant surface 49 for guiding a loosened tape into a correct position and a cavity 48 adapted to fit onto the protuberance 36 of the upper portion 35. The post cap 40 is also provided with a C-shaped claw 43 adapted to fit into the groove 34 of the lower portion 31 and a support body 41. The claw 43 and the head portion 47 are connected to each other through a connection portion 42. The support body 41 downwardly extends from a rear side of the claw 43, being fixed to the deck 10, thereby preventing the post cap 40 from rotating around the guide post 30.

As shown in FIG. 4, in a VCR incorporating therein the tape guide structure of the present invention, even though a tape cassette is loaded into the VCR with the tape T loosened to the extend that it passes over the central axis C of the guide post 30, the tape T comes in contact with the slant surface 49 of the head portion 47 of the post cap 40, thereby allowing the tape T to be loaded into the correct position, i.e., between the guide post 30 and a capstan shaft 26 as presented by the solid line L1 in FIG. 1.

Furthermore, in order to enhance the elasticity of the claw 43, a plurality of notches 46a may be formed, at positions near the connection portion 42, on the inner surface of the claw 43.

Although the invention has been shown and described with respect to the preferred embodiments, it will be understood by those skilled in the art that various changes and modifications may be made without departing from the spirit and scope of the invention as defined in the following claims.

What is claimed is:

1. A tape guide structure for use in a video cassette recorder ("VCR") into which a tape cassette is loaded, the tape guide structure comprising:

a guide post provided with an upper cylindrical portion and a lower cylindrical portion with a diameter greater than that of the upper portion, the guide post being fixed to a deck; and a post cap provided with a head portion with a slant surface, the post cap being fixed on top of the guide post, wherein the lower cylindrical portion has a circumferential groove formed therearound, and the post cap is provided with a C-shaped claw fitted into the groove, said claw being connected to the head portion through a connection portion, and a support body downwardly extending from a rear side of the claw, said support body being fixed to the deck to prevent the post cap from rotating around the guide post, wherein the slant surface of the head portion guides the tape of the tape cassette to a predetermined position relative to the guide post.

2. The tape guide structure of claim 1, wherein the upper cylindrical portion has a protuberance formed on top thereof and the head portion of the post cap is provided with a cavity fitted onto the protuberance.

3. The tape guide structure of claim 1, wherein the claw has a plurality of notches formed on the inner surface thereof.

* * * * *